Patented Jan. 2, 1945

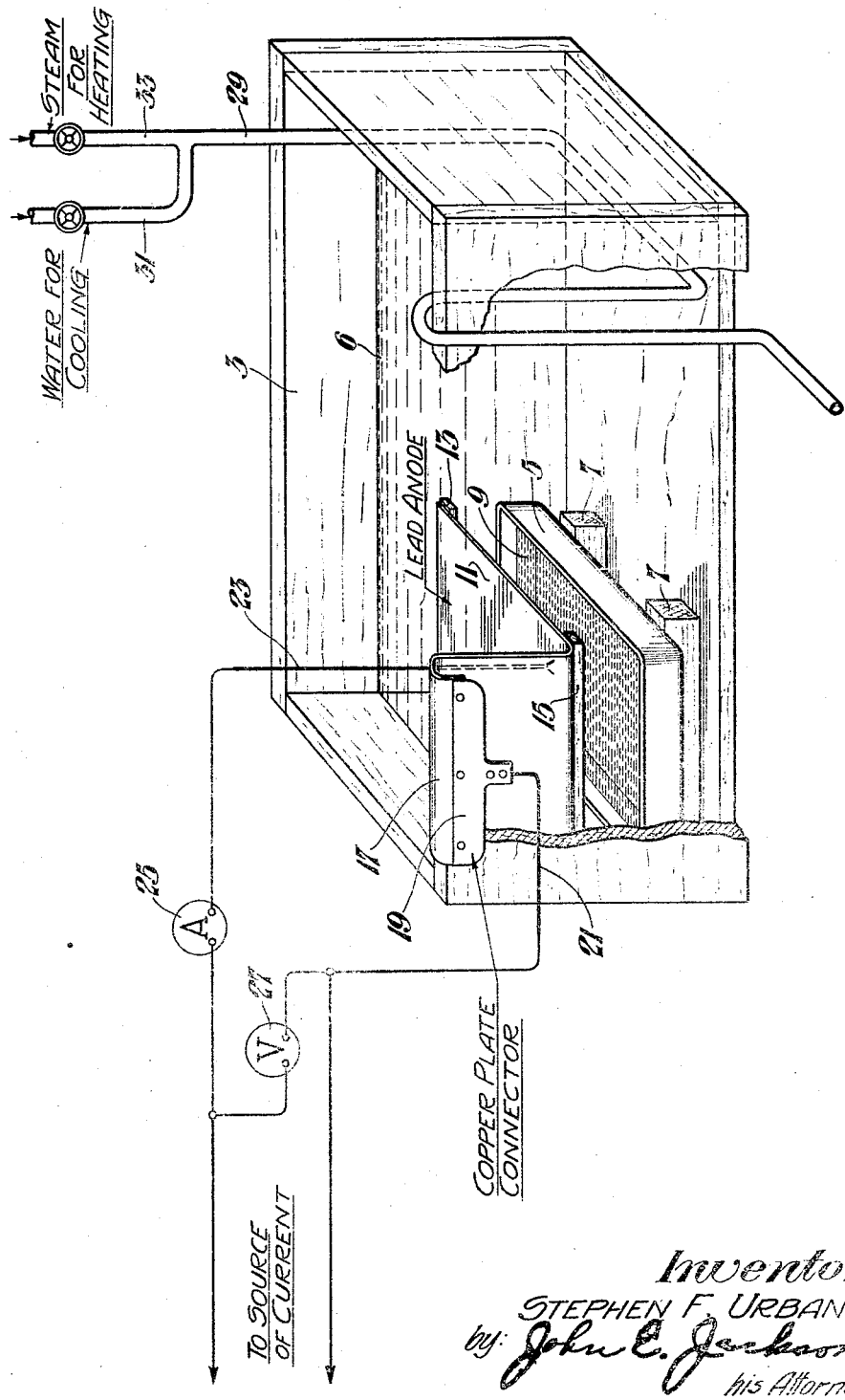

2,366,298

UNITED STATES PATENT OFFICE 2,366,298

EXTRACTION OF IRON FROM PICKLE LIQUOR OR SOLUTIONS CONTAINING IRON SALTS

Stephen F. Urban, Chicago, Ill.

Application April 19, 1941, Serial No. 389,422

9 Claims. (Cl. 204—124)

In accordance with the present invention, there are provided improvements in the recovery of iron from iron-containing solutions such as the sulphate solutions resulting from the "pickling" of steel, wherein oxide scale is removed by the action of a suitable sulphuric acid solution. It is desirable to utilize the spent liquor from the pickling operation, particularly since the disposal of such material may be rather inconvenient.

Since the spent bath in pickling operations, which constitutes the so-called "pickle liquor," cannot be discharged into a stream, in accordance with prior practice it is disposed of to the best advantage by several alternative procedures, the more practical of which includes neutralizing the free acid with iron and evaporating the excess water to obtain copperas (crystallized ferrous sulphate); treating the liquor to recover the free and combined acid as a more valuable sulphate, such as ammonium sulphate, and the iron as ferric hydroxide; treating the liquor to recover the free acid it contains by crystallizing the ferrous sulphate which itself presents a disposal problem; or neutralizing the free acid and precipitating the iron with milk of lime which gives a waste product consisting of a mixture of calcium hydroxide and ferrous hydroxide.

The last method limits the cost of all other prior art methods, although it promises no returns from the waste acid. In fact, to recover the free acid in a pure form at a cost equivalent to the market price of new acid, is impossible.

The present invention provides a process for the recovery of iron from spent pickle liquors with attendant conditioning of the residual solution so that disposal problems will be obviated to a large extent.

Generally speaking, the present invention provides a recovery of the iron from spent pickle liquors by electrolysis thereof in a cell containing a mercury cathode and an insoluble anode. The invention embodies the utilization of the addition of certain salts to the pickle liquor electrolyte which will facilitate the electrolytic stripping of the iron content therefrom. During the stripping of the iron from the solution, acid is regenerated in amounts chemically equivalent to the amount of iron removed. Any desired amount of iron may be removed from the solution by a control of the amount of electric current supplied to the cell used for electrolysis. Complete removal of iron from the solution will yield a solution containing an acid content that is equivalent to the amount of iron removed.

In accordance with the present invention, it is found that by electrolysis of spent pickle liquors or similar solutions containing ferrous and ferric iron, the iron in such solutions can be absorbed in a mercury cathode, which cathode represents part of the cell containing the solution, during the operation of the process sulphuric acid being regenerated in amounts chemically equivalent to the amount of iron absorbed in the mercury cathode. It is preferred to use an insoluble anode such as lead or platinum in the process, although any other suitable anode may be employed. After the mercury cathode has become saturated with iron, it may be separated therefrom by distillation, the mercury being distilled off from the iron and reused for further iron recovery if desired, and the powdered iron remaining in the still after distillation of the mercury may be utilized in any manner desired.

According to the invention, it has been found that in such pickling solutions containing sulphuric acid and iron salts, by providing the mercury cathode and a suitable anode as described above, the rate of absorption of iron by the mercury cathode during the course of the electrolysis and the generation of acid in the solution, is increased by the addition of certain salts, such as ammonium sulphate and stannous chloride, to the solution, either together or separately.

The amounts of ammonium sulphate that have been used in pickle liquors or similar solutions which contain up to 10 per cent of iron, have been varied from 3 to 12½ per cent without any noticeable difference in the operation.

Similar results are obtained with smaller amounts of stannous chloride, for example, 0.05 to 0.50 per cent, or the stannous chloride may be used in conjunction with ammonium sulphate or pickle liquors of similar solution if so desired.

The invention will be understood more readily by reference to the accompanying drawing, which shows rather diagrammatically a suitable apparatus for carrying out the present invention, the single view of the drawing representing a schematic perspective view of the apparatus, parts being broken away to show certain details of the construction.

Referring more particularly to the drawing, the electrolytic tank is indicated generally at 3, it being understood that this cell is composed of any suitable construction that is resistant to the electrolyte which is indicated at 6. A tray 5 resting on blocks 7 holds a mercury cathode 9, there being disposed above the tray 5 an anode 11 which preferably is a horizontal anode composed of lead of about the same area as the tray 5. The anode 11 is shown as being mounted on suitable strips 13 and 15. The anode is held in the tank 3 by bending it over a side of the tank as indicated at 17, and the anode is provided with a copper plate connector 19 which is connected to the positive side of the circuit through a lead 21 through which current is supplied from any suitable source, not shown. This may be a motor-generator set, or any other source of direct current.

The cathode 9 is connected to the negative side of the circuit through a lead 23, and it is desirable to include within the circuit a suitable ammeter 25 and a suitable voltmeter 27. There may also be provided means for controlling the temperature of the electrolyte, such means being conveniently a pipe 29 having branches 31 and 33, one of which branches, such as 31, leading to a supply of water, and branch 33 being adapted to be connected to a supply of steam, the steam and water being used to heat or cool the electrolyte, as may be found to be desirable. The pipe 29 passes through the tank 3 adjacent to the bottom thereof, as shown on the drawing, the sources of supply of the steam and water not being shown.

The following specific examples give data illustrating the results obtainable by the operation of the present invention:

*Example 1.*—In this example, the electrolyte was spent pickle liquor, with no additions of other salts. The current density employed was approximately 150 amperes per square foot. The length of time the current was passed and the amount of iron in the electrolyte were as follows:

| Time in hours | Percent ferrous iron | Percent ferric iron | Percent total iron |
|---|---|---|---|
| 0 | 8.45 | .07 | 8.52 |
| 1 | 7.85 | .65 | 7.90 |
| 2 | 6.80 | .65 | 7.45 |
| 4½ | 6.15 | .85 | 7.00 |
| 5½ |  |  | 7.42 |

*Example 2.*—Same conditions as under Example 1, except that 12½% of ammonium sulphate was added to the solution.

| Time in hours | Percent ferrous iron | Percent ferric iron | Percent total iron |
|---|---|---|---|
| 0 | 5.5 | .03 | 5.53 |
| 1 | 3.6 | 1.14 | 4.74 |
| 2 | 2.1 | 2.23 | 4.33 |
| 3 | 2.26 | .82 | 3.08 |
| 4 | .75 | .77 | 1.52 |
| 5¼ | .07 | .22 | .29 |

Percent sulphuric acid at end of 5¼ hours, 9.3%.

*Example 3.*—Same conditions as under Example 1, except that 0.15% of stannous chloride was added to the solution.

| Time in hours | Percent ferrous iron | Percent ferric iron | Percent total iron |
|---|---|---|---|
| 0 | 3.32 | 0.0 | 3.32 |
| 1 | 1.85 | 1.37 | 3.22 |
| 2 | 1.33 | 1.41 | 2.74 |
| 3 | 1.08 | 1.01 | 2.19 |
| 4 | .56 | .52 | 1.08 |
| 5 | .11 | .27 | .38 |

Percent sulphuric acid at end of 5 hours, 6.2%.

From the foregoing illustrations, it is apparent from Example 1 that the rate of removal of iron (as indicated by the percent total iron remaining in the solution) is so small as to be substantially negligible when ammonium sulphate and/or stannous chloride are absent. However, when ammonium sulphate or stannous chloride are present, the rate of removal of iron from the solution is very rapid, as will be seen from Examples 2 and 3, where in each case the electrolyte quickly became almost entirely depleted of iron.

The solution remaining after the stripping of the iron may be reused for other pickling operations or for any other purpose. The iron contained in the mercury may be recovered suitably by distillation of the mercury, as has been pointed out above, the iron so recovered being in powdered form and constituting a fairly pure grade of iron having the following typical composition:

|  | Per cent |
|---|---|
| Carbon | 0.010 |
| Manganese | 0.03 |
| Phosphorus | 0.007 |
| Sulphur | 0.048 |
| Silicon | 0.05 |
| Nickel | 0.13 |
| Chromium | 0.09 |

It will be understood that the foregoing examples are intended to be illustrative only of the invention, and are not intended to be limiting in any way, particularly in regard to the concentration of various constituents of the solution or amounts of current that may be used. The amount of current used per unit of time may be adjusted to remove iron at any desired rate.

It will be understood that with the aid of this invention iron can be recovered from pickling solutions and acid regenerated therein directly in the containers in which the pickling was conducted, so that there results a substantially continuous pickling procedure.

What is claimed is:

1. The method of recovering iron from spent pickling solutions containing iron sulphate and sulphuric acid, which comprises placing the solution in an electrolytic tank, providing a mercury cathode and an insoluble anode in the said solution, adding from about 3 to about 12½ per cent of ammonium sulphate to the said solution to increase the rate of absorption of iron to the mercury cathode upon electrolysis, and electrolyzing the said solution to deposit iron in the mercury cathode and regenerate acid in the said solution.

2. The method of recovering iron from spent pickling solutions containing iron sulphate and sulphuric acid, which comprises placing the solution in an electrolytic tank, providing a mercury cathode and an insoluble anode in the said solution, adding from about 0.05 to about 0.50 per cent of stannous chloride to the solution to increase the rate of absorption of iron by the mercury cathode upon electrolysis in the solution, and electrolyzing the said solution to deposit iron in the mercury cathode and regenerate acid with the said solution.

3. The method of recovering iron from spent sulphuric acid pickling liquors containing up to about 10 per cent of iron sulphate, which comprises placing the said solution in an electrolytic tank, providing a mercury cathode and an insoluble anode in the said solution, adding to the said solution from about 3 to about 12½ per cent of ammonium sulphate to increase the rate of absorption of iron by the mercury cathode upon electrolysis of the solution, electrolyzing the solution, and controlling the electrolysis for removing the iron from the solution at any desired rate.

4. The method of recovering iron from spent sulphuric acid pickling liquors containing up to about 10 per cent of iron sulphate, which comprises placing the said solution in an electrolytic tank, providing a mercury cathode and an insoluble anode in the said solution, adding to the said solution from about 0.05 to about 0.50 per cent of stannous chloride to increase the rate of absorption of iron by the mercury cathode upon electrolysis of the solution, electrolyzing the solution, and controlling the electrolysis for removing the iron from the solution at any desired rate.

5. The process of recovering iron from spent pickling solutions containing iron sulphate and sulphuric acid, which comprises introducing the solution into an electrolytic tank, providing a mercury cathode and an insoluble anode for the said solution, and electrolyzing the said solution in the presence of effective amounts of salts acting to increase the rate of absorption of iron by the mercury cathode and regenerate the said solution, the said salts being ammonium sulphate and stannous chloride, the said salts being added in amounts not more than about 12.5 per cent of ammonium sulphate and not more than approximately 0.5 per cent of stannous chloride.

6. The method of recovering iron from spent pickling solutions containing iron sulphate and sulphuric acid and regenerating acid therein, which comprises introducing the said solution into an electrolytic tank, providing a mercury cathode and an insoluble anode in the said solution, adding salts to the said solution which act to increase the rate of absorption of iron by the mercury cathode upon electrolysis of the solution, the said salts being ammonium sulphate and stannous chloride, and electrolyzing the solution to deposit iron on the mercury cathode with a regeneration of acid in the said solution, the said salts being added in amounts of from about 3 per cent to about 12.5 per cent of ammonium sulphate, and from about 0.05 per cent to about 0.5 per cent of stannous chloride.

7. The method of recovering iron from spent pickling solutions containing iron sulphate and sulphuric acid, which comprises placing the said solution in an electrolytic tank, providing a mercury cathode and an insoluble anode in the said solution, and electrolyzing the said solution in the presence of salts acting to increase the rate of absorption of iron by the mercury cathode, thereby depositing iron in the mercury cathode and regenerating acid in the said solution, the said salts being ammonium sulphate and stannous chloride, the said salts being added in amounts of from about 3 per cent to about 12.5 per cent of ammonium sulphate, and from about 0.05 per cent to about 0.5 per cent of stannous chloride.

8. The process of recovering iron from spent sulphuric acid pickling solutions containing up to about 10 per cent of iron sulphate, providing a mercury cathode and an insoluble anode in the said solution, and electrolyzing the said solution in the presence of salts acting to increase the rate of absorption of iron by the mercury cathode, thereby depositing iron in the mercury cathode and regenerating sulphuric acid in the said solution, the said salts being ammonium sulphate and stannous chloride, which salts are added in amounts of from about 3 per cent to about 12.5 per cent of ammonium sulphate and from about 0.05 per cent to about 0.5 per cent stannous chloride.

9. The method of recovering iron containing spent sulphuric acid pickling solutions containing iron sulphate, which comprises placing the said solution in an electrolytic tank, providing a mercury cathode and an insoluble anode in the said solution, electrolyzing the said solution in the presence of salts acting to increase the rate of absorption of iron by the mercury cathode, thereby depositing iron in the mercury cathode and regenerating sulphuric acid in the said solution, the said salts being ammonium sulphate and stannous chloride, the said salts being added in amounts of from about 3 per cent to about 12.5 per cent of ammonium sulphate and from about 0.05 per cent to about 0.5 per cent of stannous chloride, and separating the deposited iron from the mercury.

STEPHEN F. URBAN.